(No Model.)
W. W. STOCKTON & G. PHELPS.
DRAFT YOKE OR BAR FOR DOUBLE TEAMS.
No. 332,366. Patented Dec. 15, 1885.
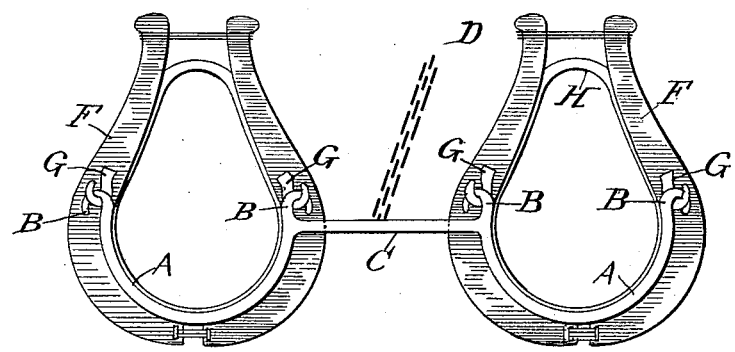
Fig. 1.
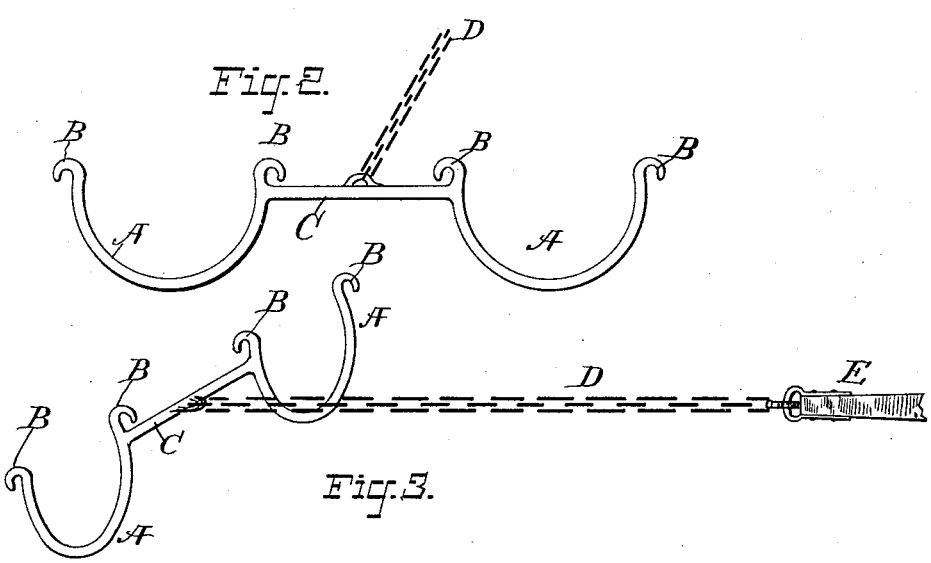
Fig. 2.
Fig. 3.
ATTEST:
INVENTORS:
George Phelps & W<sup>m</sup> W. Stockton
by their Attorney

UNITED STATES PATENT OFFICE.

WILLIAM W. STOCKTON AND GEORGE PHELPS, OF SAN JOSÉ, CALIFORNIA.

DRAFT YOKE OR BAR FOR DOUBLE TEAMS.

SPECIFICATION forming part of Letters Patent No. 332,366, dated December 15, 1885.

Application filed July 29, 1885. Serial No. 172,962. (No model.)

*To all whom it may concern:*

Be it known that we, WILLIAM W. STOCKTON and GEORGE PHELPS, citizens of the United States, and residents of San José, in the county of Santa Clara and State of California, have invented certain new and useful Improvements in a Draft Yoke or Bar for Double Teams, of which the following is a specification.

The valuable and patentable features of this our present invention have reference to certain important improvements in the form, combination, and disposition of the several elements embodied in the construction and necessary to the operation of the class of neck-yokes especially designed to be employed as a draft yoke or bar for double teams, but which in conjunction with my improvements may be devoted by the party who controls the patent to any purpose now or hereafter proposed.

Our invention consists of certain elements organized essentially as described in conformity to the accompanying drawings, adapted to operate, as hereinafter explained, for the purpose of accomplishing the above-named object, including all modifications as to their form, combination, and disposition, covered by the claim annexed to this specification, applicable to any purpose mentioned or not mentioned, but especially applicable to the uses alluded to, and different, when considered as a whole, from any device ever before known, as far as the records prove.

In order to illustrate the practical manner of carrying out our invention, drawings are hereunto annexed and described, in which similar letters of reference represent corresponding elements, and in which each part referred to is designated by a single letter.

Those parts not mentioned we do not claim in this our present application.

The materials of construction employed, the exact forms of design, and the proportional dimensions are not alluded to, as they are best determined upon by those versed in the arts.

Figure 1 shows the complete device, Fig. 2 a part of the same, and Fig. 3 the manner of attaching the device to a plow or other agricultural implement.

A are curved pieces provided with hooks B, and secured together by a straight piece, C. D is a chain secured at one end to the straight piece C and at the other to the agricultural implement E. F are the hames with hooks G located upon each hame, the harness-collars being shown at H.

The mode of operation is this: The device represented by the parts A, B, and C is attached to the hames by passing the hooks B into the hooks G and connecting the agricultural implement E to the part C by the chain D.

The invention is equally applicable to carriages, wagons, and horse-cars as to agricultural implements.

We may use solid, hollow, square, round, or any shaped bars for the parts A, B, and C.

We may alter the details of construction to suit the details of the requirements.

Having now described and particularly ascertained the nature of our said invention, and the manner in which the same is or may be used or carried into effect, we would observe that we do not confine ourselves to the exact proportions or operations specified; but

What we consider to be novel and original and therefore claim as the invention secured to us by the hereinbefore in part recited Letters Patent is—

The combination of the following elements: the hooks G, secured to the hames F, the hooks B, retained in the said hooks G, and located at the ends of the semicircular pieces A, the bar C, connecting the said semicircular pieces A, and the chain D, secured to the said bar C, substantially as and for the purpose set forth in the annexed specification and shown in the accompanying drawings.

In testimony that we claim the foregoing as our invention, we have signed our names, in presence of two witnesses, this 17th day of July, 1885.

WILLIAM W. STOCKTON.
  GEORGE PHELPS.

Witnesses:
 H. F. DUSING,
 F. G. SANBORN.